US008422357B1

(12) United States Patent
Podolsky (10) Patent No.: US 8,422,357 B1
(45) Date of Patent: Apr. 16, 2013

(54) SYSTEM, METHOD, AND COMPUTER PROGRAM PRODUCT FOR UPDATING AN INVENTORY OF NETWORK DEVICES BASED ON AN UNSCHEDULED EVENT

(75) Inventor: Gabriel Podolsky, Nesher (IL)

(73) Assignee: Amdocs Software Systems Limited, Dublin (IE)

( * ) Notice: Subject to any disclaimer, the term of this patent is extended or adjusted under 35 U.S.C. 154(b) by 827 days.

(21) Appl. No.: 11/675,805

(22) Filed: Feb. 16, 2007

(51) Int. Cl.
*G06F 11/00* (2006.01)

(52) U.S. Cl.
USPC .......................................... 370/216; 370/254

(58) Field of Classification Search .................. 717/140, 717/173; 370/216, 254; 714/43, 48, 56
See application file for complete search history.

(56) References Cited

U.S. PATENT DOCUMENTS

| | | | | |
|---|---|---|---|---|
| 5,586,254 A * | 12/1996 | Kondo et al. ................... | 714/25 |
| 5,663,963 A * | 9/1997 | Goodwin, III ................ | 714/704 |
| 5,872,911 A * | 2/1999 | Berg ............................... | 714/43 |
| 6,006,016 A * | 12/1999 | Faigon et al. ................... | 714/48 |
| 6,473,811 B1* | 10/2002 | Onsen ............................ | 710/15 |
| 6,618,823 B1 | 9/2003 | West ................................ | 714/25 |
| 7,437,445 B1* | 10/2008 | Roytman et al. .............. | 709/223 |
| 7,680,957 B1* | 3/2010 | Ketterhagen et al. ......... | 709/246 |
| 2003/0225852 A1* | 12/2003 | Bae ................................ | 709/213 |
| 2005/0073964 A1* | 4/2005 | Schmidt et al. ............... | 370/260 |
| 2005/0268043 A1* | 12/2005 | Kitamura ....................... | 711/131 |
| 2006/0029007 A1 | 2/2006 | Ayyagari ....................... | 370/310 |
| 2006/0168184 A1* | 7/2006 | Rentschler .................... | 709/223 |
| 2006/0248517 A1* | 11/2006 | Bartsch et al. ................ | 717/140 |
| 2007/0044156 A1* | 2/2007 | Redmann ....................... | 726/25 |
| 2007/0055797 A1* | 3/2007 | Shimozono .................... | 710/36 |
| 2007/0083788 A1* | 4/2007 | Johnson et al. ................. | 714/1 |
| 2007/0156861 A1* | 7/2007 | Nedelcu et al. ............... | 709/220 |
| 2007/0201380 A1* | 8/2007 | Ma et al. ........................ | 370/254 |
| 2007/0220282 A1* | 9/2007 | Huang ............................ | 713/300 |
| 2007/0253329 A1* | 11/2007 | Rooholamini et al. ....... | 370/220 |
| 2007/0274239 A1* | 11/2007 | Nguyen et al. ................ | 370/282 |
| 2008/0134165 A1* | 6/2008 | Anderson et al. ............ | 717/173 |
| 2008/0172732 A1* | 7/2008 | Li et al. ........................... | 726/15 |
| 2008/0216157 A1* | 9/2008 | Huuhtanen et al. ............ | 726/4 |
| 2009/0168701 A1* | 7/2009 | White et al. .................... | 370/328 |
| 2010/0042708 A1* | 2/2010 | Stamler et al. ................ | 709/221 |
| 2010/0262663 A1* | 10/2010 | Andrews et al. .............. | 709/206 |
| 2010/0284307 A1* | 11/2010 | Wall et al. ..................... | 370/254 |
| 2011/0258325 A1* | 10/2011 | Benfield et al. ............... | 709/226 |

FOREIGN PATENT DOCUMENTS

WO    WO 2006/039865 A1    4/2006

OTHER PUBLICATIONS

Li, System for ensuring quality of service, Oct. 27, 2005, in regard to using the translation of US 2008/0172732 A1.*

* cited by examiner

*Primary Examiner* — Mark Rinehart
*Assistant Examiner* — Christopher R Crompton
(74) *Attorney, Agent, or Firm* — Zilka-Kotab, PC (57) ABSTRACT

A network inventory system, method, and computer program product are provided. In use, an unscheduled event is identified. In various embodiments, the unscheduled event includes a request to update a network device, a request to update information associated with a network device that is stored in the inventory of network devices, etc. Further, an inventory of network devices is updated based on the unscheduled event.

15 Claims, 7 Drawing Sheets

SYSTEM, METHOD, AND COMPUTER PROGRAM PRODUCT FOR UPDATING AN INVENTORY OF NETWORK DEVICES BASED ON AN UNSCHEDULED EVENT

FIELD OF THE INVENTION

The present invention relates to networks, and more particularly to inventorying network devices.

BACKGROUND

Traditionally, networks have been utilized for providing connections between devices located thereon. Oftentimes, it is desired to inventory network devices located on the network. For example, such network inventory may be utilized for configuring, activating, etc. resources associated with the network devices. Customarily, updates (e.g. refreshes, etc.) to network inventories have been performed on a scheduled basis. However, scheduling the updating of network inventories frequently results in such network inventories being outdated, particularly at times between the scheduled updates. There is thus a need for addressing these and/or other issues associated with the prior art.

SUMMARY

A network inventory system, method, and computer program product are provided. In use, an unscheduled event is identified. Further, an inventory of network devices is updated based on the unscheduled event.

DETAILED DESCRIPTION

Figure 1:
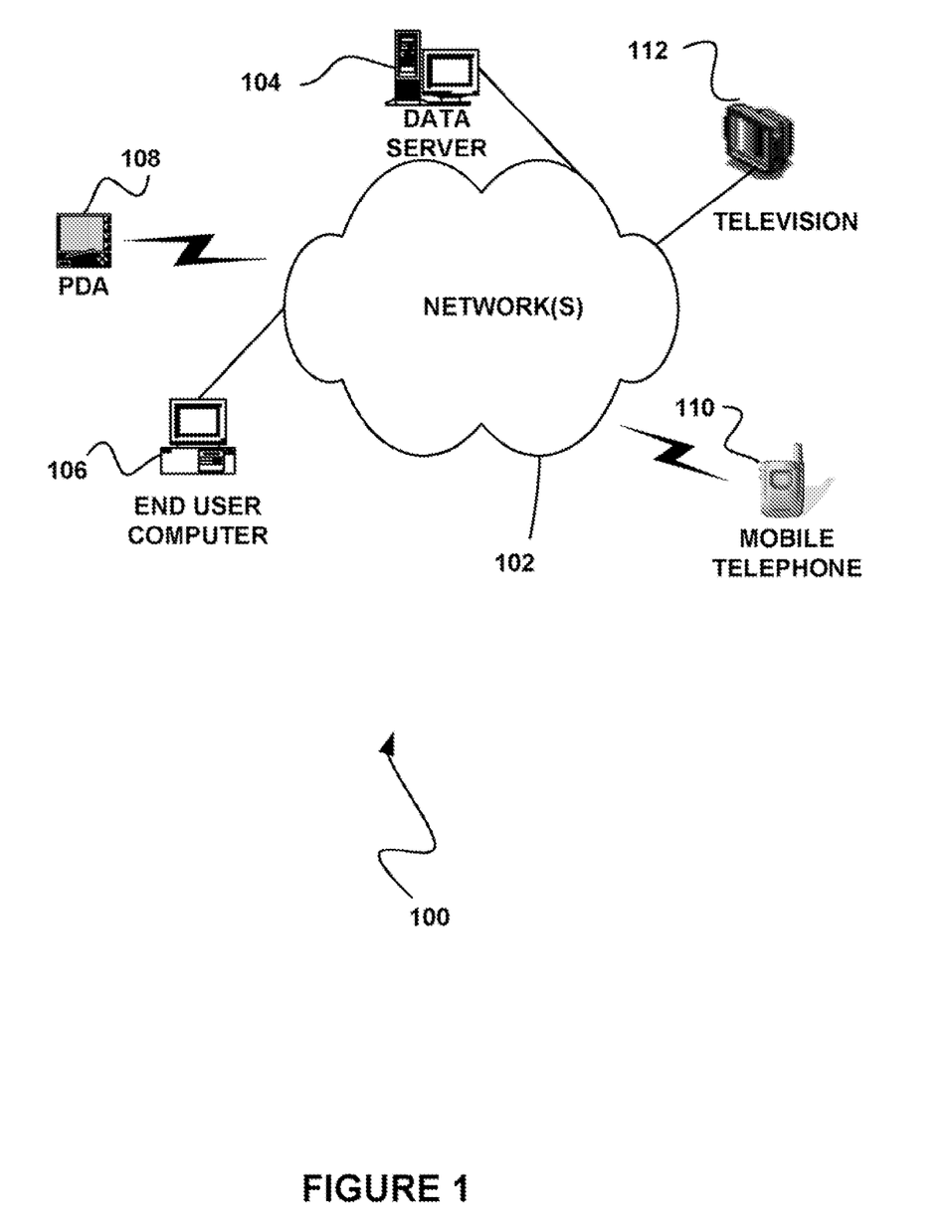
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
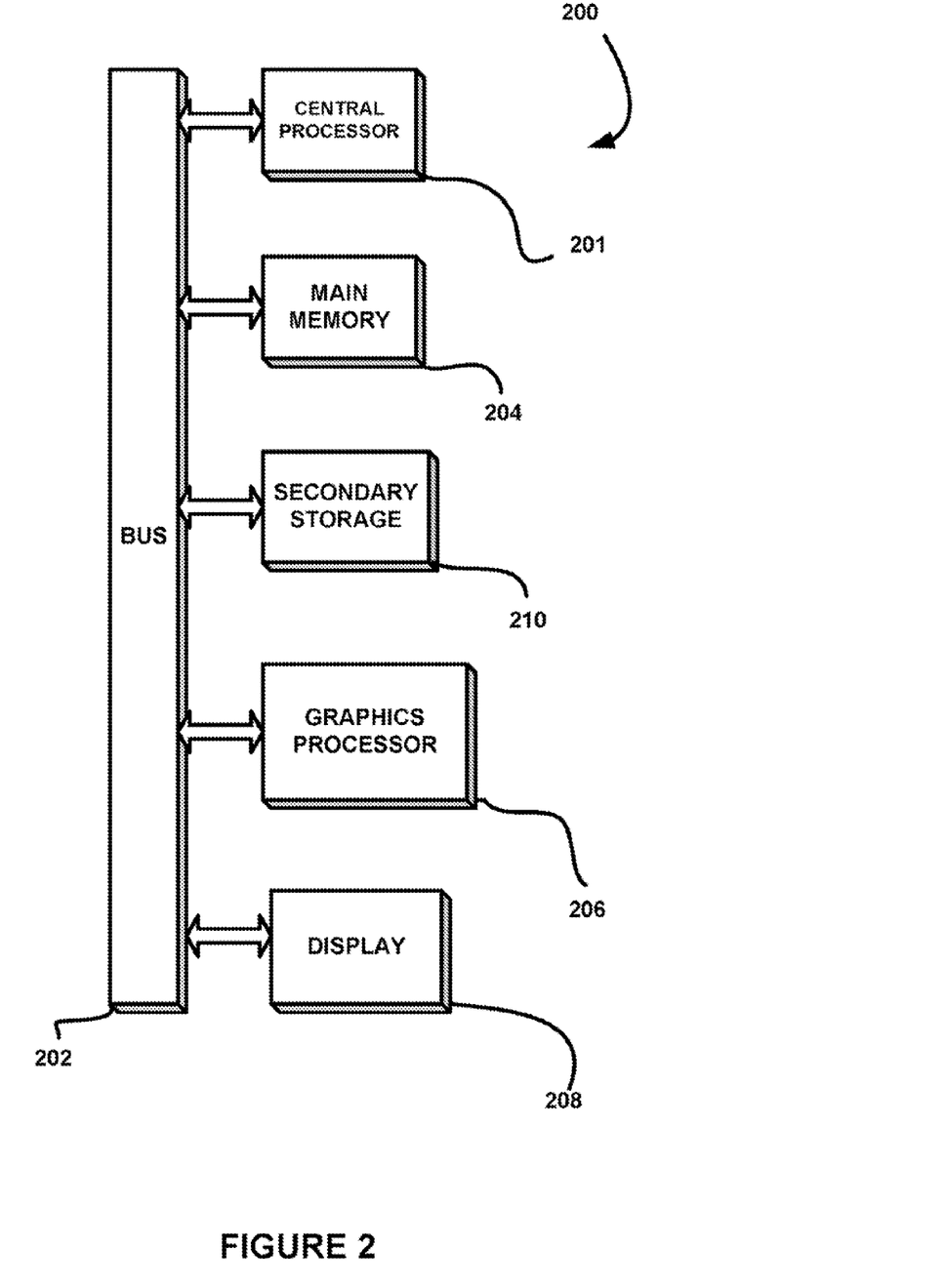
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Figure 3:
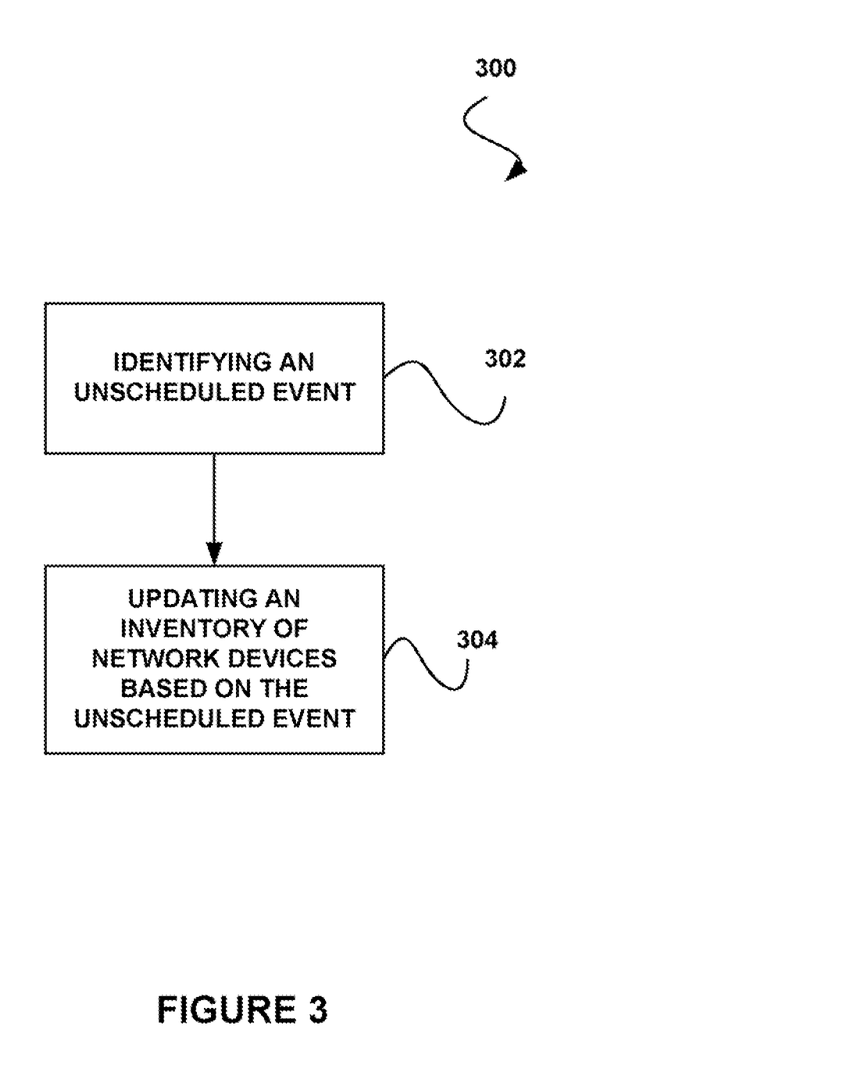
FIG. 3 illustrates a method for updating an inventory of network devices based on an unscheduled event, in accordance with one embodiment.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media FIG. 3 illustrates a method 300 for updating an inventor of network devices based on an unscheduled event, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an unscheduled event is identified. The unscheduled event may include any unscheduled (e.g. ad hoc, spontaneous, impromptu, unplanned, unforeseen, unexpected, unintentional, etc.) event. In various optional embodiments, the event may include any action, incident, etc. capable of being performed and/or identified. Moreover, the unscheduled event may include a manually initiated event and/or an automatically initiated event.

In one embodiment, the unscheduled event may include an on-demand event. For example, the on-demand event may include a request to update a network device. In the context of the present description, the network device may include any device capable of being located on a network. Just by way of example, the network device may include any of the devices described above with respect to FIGS. 1 and/or 2. In addition, the network may include any of the networks described above with respect to FIG. 1, but, of course, may also include any network capable of having a device located thereon.

Still yet, the aforementioned request to update the network device may, in one possible embodiment, include a request to update device information stored in an inventory of network devices. More information regarding such inventory will be described in more detail below. The device information may include, for example, identified resources associated with the network device (e.g. port, network card, etc.), identified applications associated with the network device, a configuration of the network device, and/or any other information capable of being associated with the network device.

Of course, it should be noted that the request to update the device may also include a request to update an aspect of the device. For example, such aspect may optionally include a resource of the device, etc. Further, as an option, the on-demand event may be initiated by a user.

In another embodiment, the unscheduled event may include a failed process. Such failed process may be associated with a network device, for example. Accordingly, the failed process may optionally include a process that failed to be executed by the network device, a process that failed to be executed on the network device remotely, etc.

Additionally, in one exemplary embodiment, the failed process may include a failed activation request. Such activation request may include a request to activate the network device. As another option, the activation request may include a request to activate an aspect of the network device. For example, the activation request may include a request to activate any resource, application, etc. of the network device. In other various embodiments, the failed process may also include a failed configuration request, a failed provision made to the network device, a failed fulfillment associated with the network device, etc.

It should be noted that the failed process may be caused by any factor capable of preventing execution (e.g. partial and/or complete execution) of the process. In the context of the failed activation request described above, such activation request may optionally fail due to an associated network device and/or resource of the network device not being available for such activation. For example. the network device may not be located on a network over which such activation request is provisioned, the resource associated with the activation request may not be included in the network device to which the activation request is directed, etc. While various unscheduled events have been described above, it should be noted that any unscheduled event may be identified.

Furthermore, an inventory of network devices is updated based on the unscheduled event, as shown in operation 304. For example, the unscheduled event may optionally indicate that the inventory of network devices and the network devices themselves are not synchronized (e.g. the inventory indicates that a network device is located on the network when it in fact is not located thereon or visa-versa, the inventory indicates that a resource is available on a network device when in fact it is not available for the particular network device or visa-versa, etc.). Thus, the unscheduled event may indicate the need for an update to the inventory of network devices.

In one embodiment, the inventory of network devices may be automatically updated in response to the unscheduled event. In the context of the present description, the inventory of network devices may include any compilation of information associated with the network devices. Just by way of example, the inventory of network devices may include an operational support system (OSS) inventory, a network inventory system, a service inventory system, etc.

In addition, the information associated with the network devices that is included in the inventory may include, for example, identifiers that identify the network devices, resources associated with the network devices, configurations of the network devices, programs (e.g. applications, operating system, etc.) stored on the network devices, versions of the network devices and/or programs located thereon, and/or any other information capable of being associated with the network devices. Accordingly, in various embodiments, the inventory of network devices may identify devices on the network and/or any other information associated therewith. Of course, it should be noted that the inventory may further be compiled utilizing any desired type of data structure (e.g. database, tree, list, etc.).

Moreover, the inventory of network devices may be updated in any desired manner. In one embodiment, the inventory of network devices may be updated by gathering information from the network device associated with the unscheduled event. Of course, it should be noted that while the gathering of information associated with a single network device is described, information associated with a plurality of network devices, which may or may not be associated with the unscheduled event, may also be gathered separately and/or in combination.

Additionally, in one possible embodiment, such information may be gathered by directly requesting the information from the network device over the network. As another option, the information may be gathered indirectly via an element management system (EMS). Such EMS may include any system capable of gathering and/or storing information associated with network devices. The EMS may also optionally manage the network. Further, the information may be gathered utilizing simple network management protocol (SNMP), command line interface (CLI), transaction language 1 (TL1), etc.

Still yet, the updating may include replacing information in the inventory of network devices with the gathered information. Of course, such replacing may be based on a comparison of the gathered information with the inventory of network devices. Thus, the inventory of network devices may be updated with current information gathered from the network device associated with the unscheduled event.

To this end, the inventory of network devices may be updated based on the unscheduled event to more accurately reflect an actual physical network configuration. Accordingly, updates to the inventory of network devices may be provided without respect to a scheduled update (e.g. daily, monthly, etc.), therefore allowing for an updated (e.g. current) inventory of network devices at any time an unscheduled event is identified. Of course, embodiments are contemplated where the updating of an inventory of network devices based on unscheduled events may be implemented in conjunction with the updating of such inventory on a scheduled basis.

More illustrative information will now be set forth regarding various optional architectures and uses in which the foregoing method may or may not be implemented, per the desires of the user. It should be strongly noted that the following information is set forth for illustrative purposes and should not be construed as limiting in an manner. Any of the following features may be optionally incorporated with or without the exclusion of other features described.

Figure 4A:
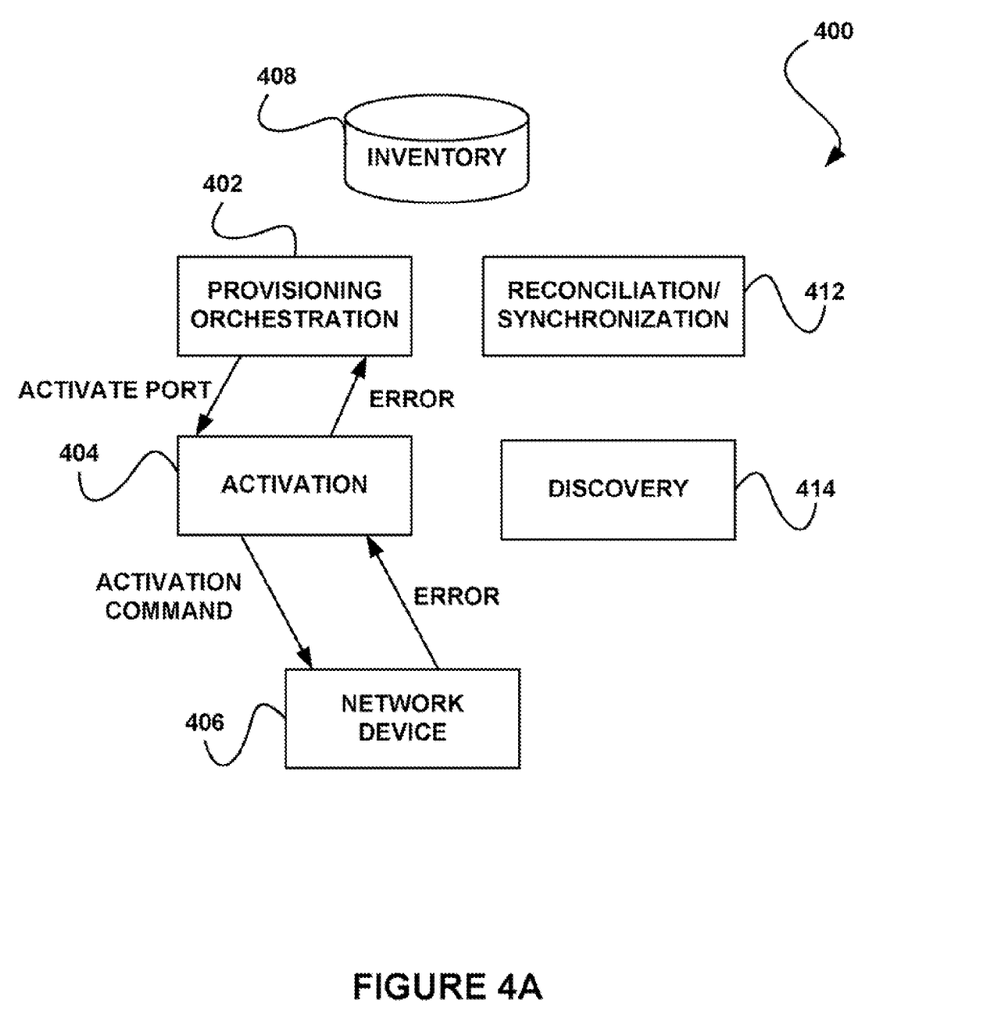
FIGS. 4A-C illustrate a system for updating an inventory of network devices based on failure of a resource activation associated with a network device, in accordance with another embodiment.
Figure 4B:
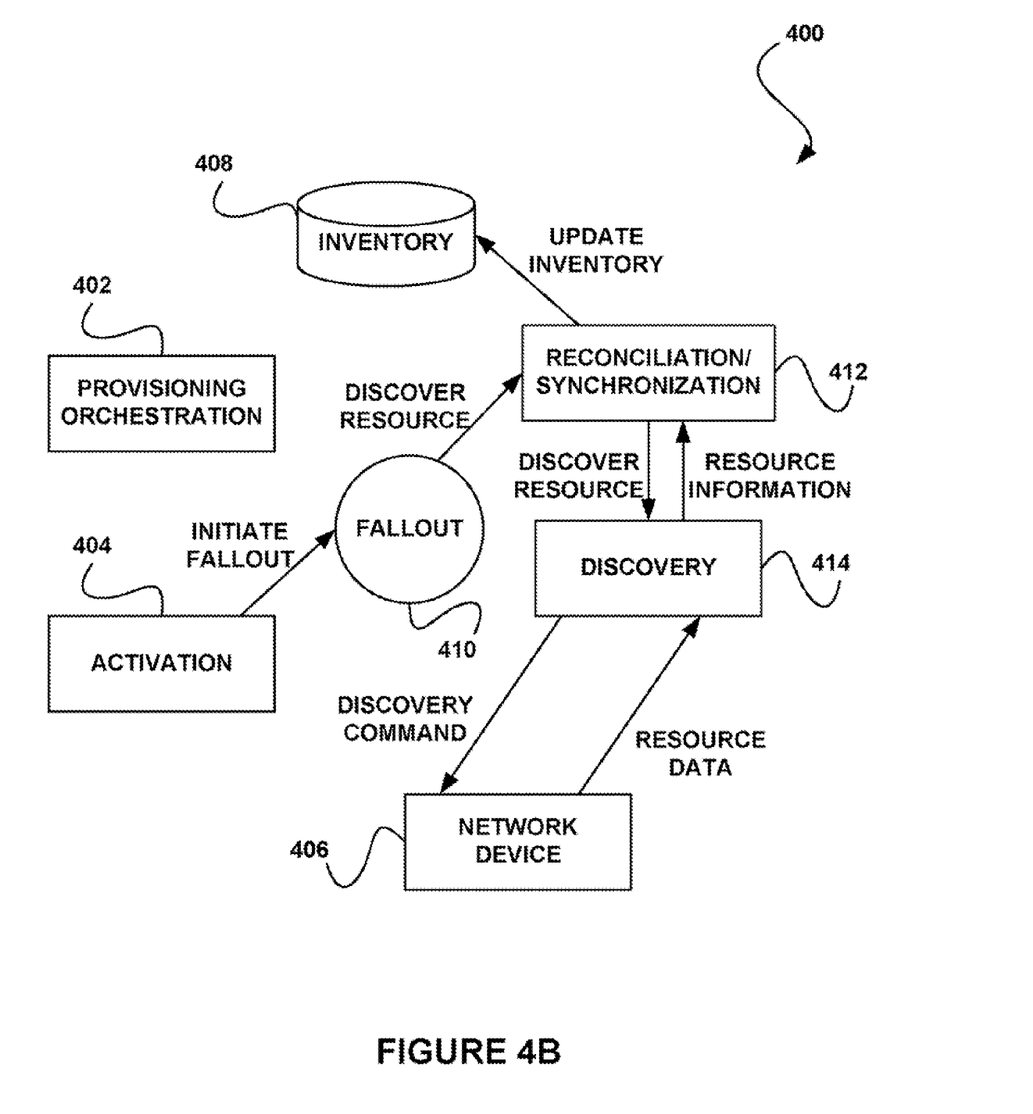
Figure 4C:
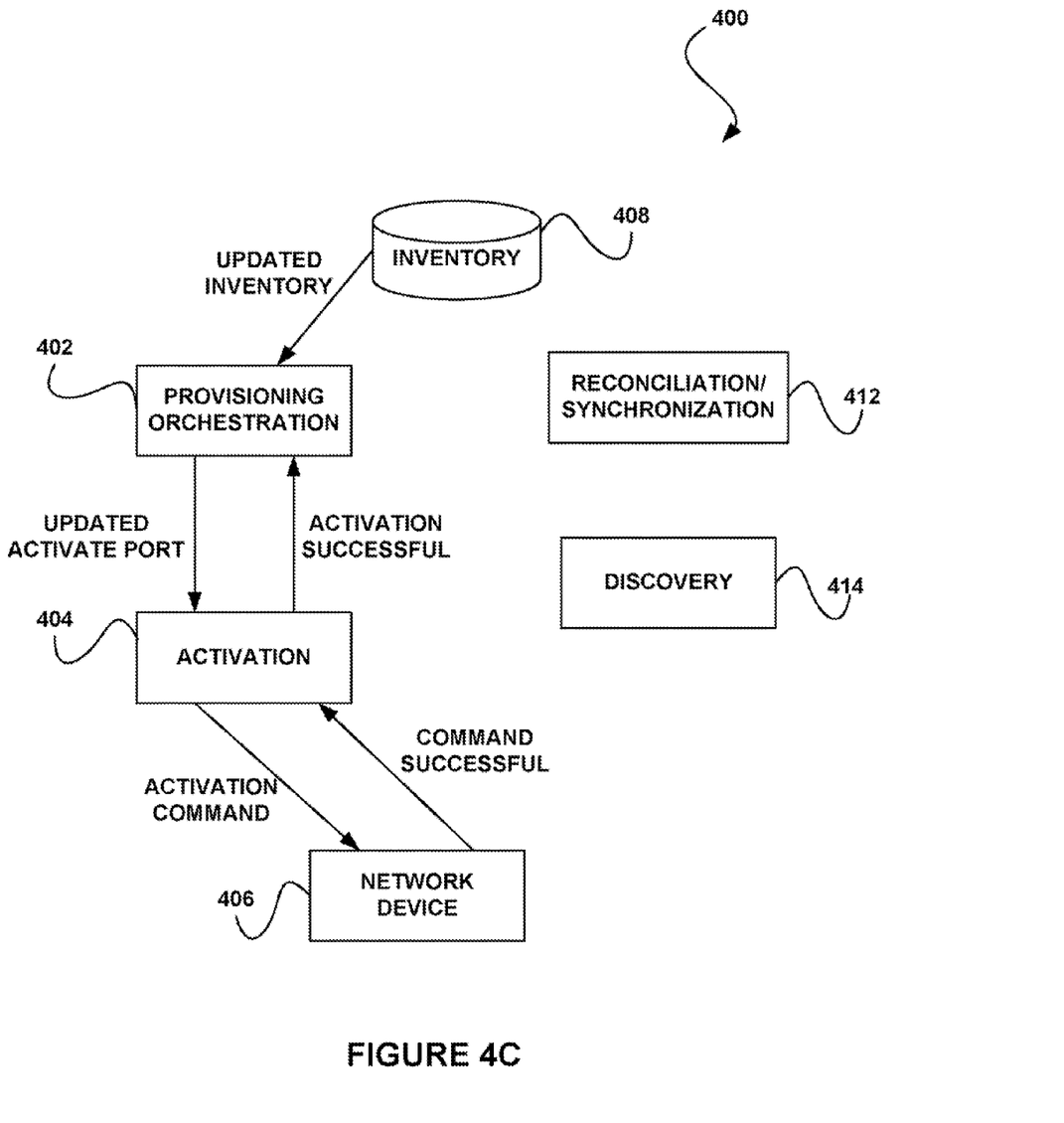

FIGS. 4A-C illustrate a system 400 for updating an inventory of network devices based on failure of a resource activation associated with a network device, in accordance with another embodiment. As an option, the system 400 may be implemented in the context of the details of FIGS. 1-3. Of course, however, the system 400 may be implemented in any desired context. Further, the aforementioned definitions may equally apply to the description below.

As shown in FIG. 4A, a provisioning orchestration module 402 provisions (e.g. issues) an activate port request to an activation module 404. The provisioning orchestration module 402 may include any module capable of provisioning a request (and/or command) to any other module (e.g. activation module 404) capable of further provisioning such request to a network device 406. Further, the activation module 404 may include any module capable of issuing a command to a network device 406 in response to a request received by the provisioning orchestration module 402. While the provisioning orchestration module 402 is shown issuing the activate port request to the activation module 404, it should be noted that, in another optional embodiment, the provisioning orchestration module 402 may issue the request directly to the network device 406.

It should be further noted that, in various other embodiments, such request may include any activation request, configuration request, status request, and/or any other request capable of being ultimately provisioned to a network device 406. Further, the provisioning orchestration module 402 may provision the activate port request based on the inventory 408. The inventory 408 may include, for example, a compilation of network devices 406 and information associated therewith (e.g. resources associated with such network devices 406, configurations of such network devices 406, etc.).

In this way, the provisioning orchestration module 402 may provision requests according to data in the inventory 408 (e.g. only to network devices 406 in the inventory, only to resources identified in the inventory, etc.). As also shown, the activation module 404 issues an activation command to the network device 406. Thus, the activation module 404 may issue a command to the network device 406 in response to a request received from the provisioning orchestration module 402.

Moreover, the activation module 404 receives an error from the network device 406. For example, the error may be received is response to the activation command issued by the activation module 404. Such error may indicate the failure of the activation command to be processed (e.g. fulfilled, etc.) by the network device 406.

In one embodiment, the error may be generated by the network device 406 because a resource of the network device 406 is unable to be activated according to the activation command issued by the activation module 404. Such resource may be unable to be activated because it does not exist (e.g. is not found) with respect to the network device 406, for example. Of course, however, anything capable of causing failure of the activation command to be processed by the network device 406 may initiate the error being sent from the network device 406 to the activation module 404.

Thus, in the context of the present example, the error may be received by the activation module 404 in response to failure of the port associated with the activation command to be activated. Accordingly, failure of the activation command to be processed max be identified by the activation module 404 via the error sent from the network device 406. In addition, the error may include any indication of the failure of the activation command to be processed. Just by way of example, the error may indicate the reason for the failure, the time of the failure, etc. Still yet, the error may be forwarded from the activation module 404 to the provisioning, orchestration module 402, as shown.

To this end, the error may be issued in response to an unscheduled event. For example, in the context of the present example, such unscheduled event may include the failure of the activation command to be processed by the network device 406. Moreover, such unscheduled event may indicate that the inventory 408 is not up-to-date with current information associated with the network device 406.

Just by way of example, the inventory may indicate that the network device 406 has a particular port, such that the provisioning orchestration module 402 provisions a request for such port to be activated. If the network device 406 does not, in fact, have the port associated with the activation request, an error may be generated due to the failure of the port to be activated. Thus, the error may indicate that the inventory 408 does not include current information for the network device 406 associated with the activation request.

As shown in FIG. 4B, the activation module 404 initiates a fallout procedure 410. For example, the fallout procedure 410 may be initiated in response to the error received by the activation module 404, as described above with respect to FIG. 4A. Optionally, the fallout procedure 410 may be executed within the activation module 404.

In the context of the present embodiment, the fallout procedure 410 may cause a reconciliation/synchronization module 412 to initiate discovery and/or reconciliation of the resource associated with the activation failure. Accordingly, the reconciliation/synchronization module 412 may include any module capable of initiating discovery and/or reconciliation of the resource and/or any other information associated with the network device 406. Further, the discovery may include gathering information associated with the network device 406 for which the activation failed. By way of example, the information may include data related to all resources associated with the particular network device 406, but, of course, may also include only data associated with the particular resource of the network device 406 associated with the activation failure.

As shown, the reconciliation/synchronization module 412 initiates discovery of the resource by sending a discover resource request to a discovery module 414. Accordingly, in one embodiment, such discover resource request may be immediately issued in response to the initiation of the fallout procedure 410. The discovery module 414 may include any module capable of issuing a discovery command to the network device 406, as shown. Of course, it should be noted that, while the discovery command is shown as issued via the discovery module 414, the reconciliation/synchronization module 412 may also directly issue the discovery request to the network device 406, in other optional embodiments.

Further, the network device 406 sends resource data (e.g. information associated with resources of the network device 406, information associated with the failed activation command, etc.) to the discovery module 414. Such resource data may be based on the particular discovery command issued by the discovery module 414 to the network device 406. Thus, the resource data may be sent to the discovery module 414 in response to the discovery command.

Still yet, the discovery module 404 sends resource information gathered from the resource data to the reconciliation/synchronization module 412. In one embodiment, the network device 406 may send resource data to the discovery module 414 which includes information associated with all resources on the network device 406. The discovery module 414 may then extract information associated with the particular resource for which the activation failed from such resource data and send such extracted information to the reconciliation/synchronization module 412.

In another embodiment, the network device 406 may send resource data to the discovery module 414 which only includes information associated with the particular resource for which the activation failed. Accordingly, the discovery module 414 may forward such information to the reconciliation/synchronization module 412. Of course, it should be noted that the discovery module 414 may send any of the resource data received by the network device 406 to the reconciliation/synchronization module 412. As an option, the discovery module 414 may also format the resource information sent to the reconciliation/synchronization module 412.

As also shown, the reconciliation/synchronization module 412 updates the inventory 408 with the resource information received from the discovery module 414. Thus, the inventory 408 may ultimately be updated with at least a portion of the information sent from the network device 406. In one embodiment, the inventory 408 may be updated by replacing information within the inventory 408 with the resource information received from the discovery module 414. Of course, the inventory 408 may also be updated in any other desired manner.

In this way, the inventory 408 may be updated in response to the unscheduled event described above with respect to FIG. 4A. Accordingly, the inventory 408 may be capable of being updated when an update is identified via the unscheduled event, thus preventing periods of time in which the inventory 408 is out-of-date and an update is available, particularly due to the utilization of only scheduled updates. To this end, the updated inventory 408 may reflect current information associated with at least one aspect (e.g. resource, etc.) of the network device 406.

Furthermore, as shown in FIG. 4C, the updated inventory 408 is made available to the provisioning orchestration module 402, such that the provisioning orchestration module 402 may provision an updated activate port request to the activation module 404. Such updated activate port request may include a request to activate a port that is associated with the network device 406, as identified utilizing the updated inventory 408. Strictly as an option, such request may be prompted by the completion of the tasks in FIG. 4B.

In response to receipt of the updated activate port request, the activation module 404 issues an activate command to the network device 406. For example, the activate command may identify current port information associated with the network device 406 as identified by the updated inventory 408. In this way, a port associated with the network device 406 may be activated.

Additionally, the network device 406 sends a command successful notification to the activation module 404. The command successful notification may indicate that the activation command was processed by the network device 406. Moreover, the command successful notification may indicate that the port associated with the activate command was activated. Of course, however, the command successful notification may include any desired information.

An activation successful notification is further sent from the activation module 404 to the provisioning orchestration module 402. As a result, the provisioning orchestration module 402 that originally provisioned the activate port request may receive notification when the port is activated. To this end, an initial activation request that fails, as described above with respect to FIG. 4A, may be successfully re-issued utilizing an inventory 408 that is updated based on such failed activation request.

Accordingly, the inventory 408 may be automatically updated, and therefore an updated activation request successfully processed, in an efficient manner. For example, manual intervention and/or scheduled updates with respect to the inventory 408 may be prevented, along with any invalidation of the resource from being subjected to further activation requests due to an out-of-date inventory 408. Of course, however, it should be noted that manual action may also optionally be taken in response to the updated inventory 408 described above. Just by way of example, such manual action may include analyzing the cause of the unscheduled event, manually fixing such cause, etc.

Figure 5:
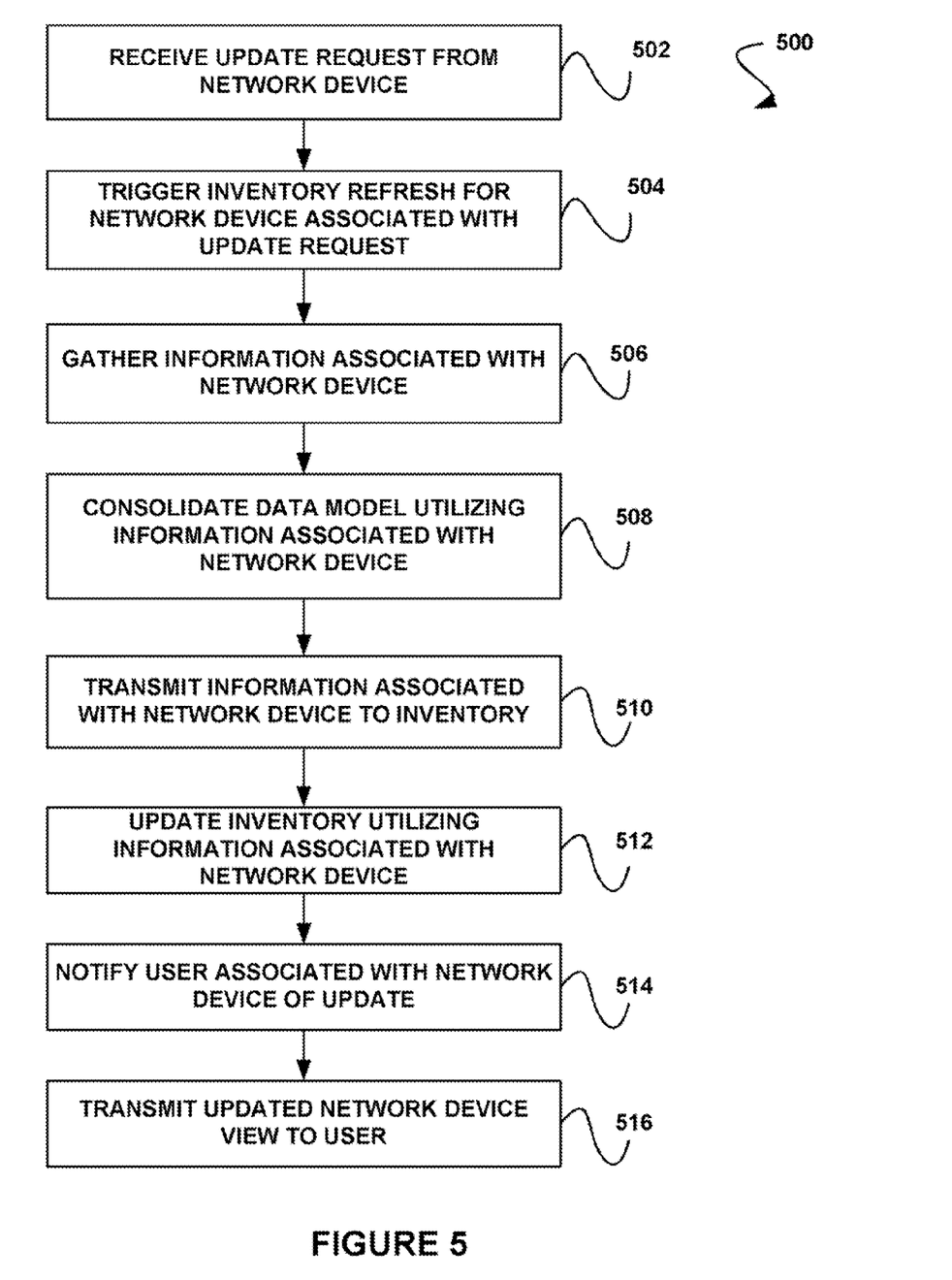
FIG. 5 illustrates a method for updating an inventory of network devices based on a user request to update a network device, in accordance with yet another embodiment.

FIG. 5 illustrates a method 500 for updating an inventor of network devices based on a user request to update a network device, in accordance with yet another embodiment. As an option, the method 500 may be carried out in the context of the details of FIGS. 1-4C. Of course, however, the method 500 may be carried out in any desired context. Further, the aforementioned definitions may equally apply to the description below.

As shown in operation 502, an update request is received from a network device. Optionally, the update request may be received from a user utilizing the network device. The update request may include any request to update information associated with the network device. For example, in the context of the present description, the update request may include a request to update information associated with the network device within an inventory of network devices. Further, the information included in the update request may include a request for all types of information associated with the network device (e.g. resources, configuration, etc.) and/or any combination thereof to be updated. Thus, for example, the update request may include a request to update a particular resource of the network device, all information associated with the network device, etc.

In addition, an inventory refresh for the network device associated with the update request is triggered, as shown in operation 504. Such inventory refresh may include replacing information associated with the network device that is in the inventory of network devices with current information associated with the network device. In one embodiment, the inventory refresh may be triggered by initiating a process, such as the gathering of information associated with the network device (see operation 506).

The gathered information may include any information capable of being associated with the network device. Optionally, the information may be gathered by a discover module, such as the discovery module described above with respect to FIGS. 4A-C, for example. As a further option, the information may be gathered over a network on which the network device is located.

As shown in operation 508, a data model is consolidated utilizing the gathered information. For example, the data model may be associated with the discovery module. In one embodiment, the data model may include a format to which the gathered information is converted. Such format may optionally indicate how the data is represented and/or utilized. As another option, the data model may be consolidated by updating the data model with the gathered information. Of course, however, the data model may include any model which may be consolidated utilizing the gathered information.

Still yet, the information associated with the device is transmitted to an inventory of network devices, as shown in operation 510. In one optional embodiment, the information may be transmitted to the inventory from the discovery module via a reconciliation/synchronization module, such as for example the reconciliation/synchronization module described above with respect to FIGS. 4A-C. Of course, however, the information may be transmitted to the inventory in any desired manner.

Furthermore, the inventory is updated utilizing the information, as shown in operation 512. The inventory may be updated by replacing information within the inventory with the gathered information associated with the network device, for example. In this way, the inventory of network devices may be updated with current information gathered from the network device.

Additionally, as shown in operation 514, a user associated with the network device is notified of the update. Of course, however, any desired user (administrator, etc.) may be notified of the update. The notification may include, for example, a confirmation that information in the inventory associated with the network device has been updated, a time of the update, and/or any other information capable of being associated with the updated inventory.

Moreover, an updated network device view is transmitted to the user, as shown in operation 516. The network device view may identify any information associated with the network device that is stored in the inventory of network devices. Just by way of example, the network device view may identify resources of the network device, a configuration of the network device, etc.

In this way, an inventory of network devices may be automatically updated in response to an unscheduled event, where such unscheduled event includes a request to update information associated with the network device within the inventory of network devices. In this way, the inventory of network devices may be updated on-demand. Of course, it should be noted that while the updating of information associated with a network device requesting the update is described above, an update request may also be received by any network device for updating the inventory with information that is associated with any other network device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
  receiving at an activation module an error associated with an unscheduled event, where the unscheduled event includes a first activation command sent from the activation module to a network device, and where the error is sent by the network device identified in an inventory of network devices and includes an indication of a failure of the first activation command to activate a port of the network device;
  updating the inventory of network devices based on the error associated with the unscheduled event, utilizing a processor, by gathering updated port information from the network device and replacing port information associated with the network device that is in the inventory of network devices using the updated port information gathered from the network device; and
  identifying the updated port information utilizing the updated inventory of network devices, and issuing a second activation command to activate the port of the network device in response to the identification of the updated port information for activating the port.

2. The method of claim 1, wherein the unscheduled event includes an on-demand event.

3. The method of claim 1, wherein the activation module is separate from the inventory of the network devices.

4. The method of claim 1, further comprising notifying a user of the update of the inventory of the network devices.

5. The method of claim 1, further comprising transmitting a network device view to a user utilizing the updated inventory of the network devices.

6. The method of claim 1, wherein the inventory of network devices includes information associated with each of a plurality of network devices, including identifiers that identify the network devices, resources associated with the network devices, configurations of the network devices, applications and an operating system stored on the network devices, and versions of the network devices.

7. The method of claim 1, wherein a reconciliation module other than the activation module initiates the gathering of the updated port information associated with the network device.

8. The method of claim 7, wherein the reconciliation module initiates the gathering of the updated port information by sending a discover resource request to a discovery module other than the reconciliation module and the activation module, where the discovery module then issues a discovery command to the network device.

9. The method of claim 8, wherein the inventory of network devices is updated with the updated port information received from the network device by the discovery module in response to the discovery command.

10. The method of claim 1, wherein the error further indicates that the inventory of network devices does not include current information for the network device.

11. The method of claim 1, wherein the error indicates a reason for the failure and a time of the failure.

12. A non-transitory computer readable storage medium storing a computer program product executable by a processor, the computer program product comprising:
  computer code for receiving at an activation module an error associated with an unscheduled event, where the unscheduled event includes a first activation command sent from the activation module to a network device, and where the error is sent by the network device identified in an inventory of network devices and includes an indication of a failure of the first activation command to activate a port of the network device;
  computer code for updating the inventory of network devices based on the error associated with the unscheduled event, utilizing a processor, by gathering updated port information from the network device and replacing port information associated with the network device that is in the inventory of network devices using the updated port information gathered from the network device; and
  computer code for identifying the updated port information utilizing the updated inventory of network devices, and issuing a second activation command to activate the port of the network device in response to the identification of the updated port information for activating the port.

13. A system, comprising:
  a hardware processor for:
  receiving at an activation module an error associated with an unscheduled event, where the unscheduled event includes a first activation command sent from the activation module to a network device, and where the error is sent by the network device identified in an inventory of network devices and includes an indication of a failure of the first activation command to activate a port of the network device;
  updating the inventory of network devices based on the error associated with the unscheduled event, utilizing a processor, by gathering updated port information from the network device and replacing port information associated with the network device that is in the inventory of network devices using the updated port information gathered from the network device; and
  identifying the updated port information utilizing the updated inventory of network devices, and issuing a second activation command to activate the port of the network device in response to the identification of the updated port information for activating the port.

14. The system of claim 13, further comprising memory coupled to the hardware processor via a bus.

15. The method of claim 5, wherein the network device view identifies resources of the network device including the resource of the device requested to be updated and a configuration of the network device.

* * * * *